United States Patent
Kratz et al.

(10) Patent No.: US 10,225,656 B1
(45) Date of Patent: Mar. 5, 2019

(54) MOBILE SPEAKER SYSTEM FOR VIRTUAL REALITY ENVIRONMENTS

(71) Applicant: Harman International Industries, Incorporated, Stamford, CT (US)

(72) Inventors: Sven Kratz, San Jose, CA (US); Adam Boulanger, Palo Alto, CA (US); Joseph Verbeke, San Francisco, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/873,852

(22) Filed: Jan. 17, 2018

(51) Int. Cl.
| | |
|---|---|
| *H04R 5/02* | (2006.01) |
| *H04S 7/00* | (2006.01) |
| *G06F 3/01* | (2006.01) |
| *G06T 19/00* | (2011.01) |

(52) U.S. Cl.
CPC ............ *H04R 5/02* (2013.01); *G06F 3/011* (2013.01); *G06T 19/003* (2013.01); *H04S 7/302* (2013.01); *H04S 7/305* (2013.01)

(58) Field of Classification Search
None
See application file for complete search history.

(56) References Cited

U.S. PATENT DOCUMENTS

| | | | |
|---|---|---|---|
| 5,185,801 A | | 2/1993 | Meyer et al. |
| 5,404,406 A | * | 4/1995 | Fuchigami ............ H04S 1/002 381/17 |
| 8,976,986 B2 | * | 3/2015 | Angeloff .................. H03G 3/30 381/108 |
| 9,596,544 B1 | * | 3/2017 | Brotherton ............... H04R 5/02 |
| 2002/0060267 A1 | | 5/2002 | Yavnai |
| 2005/0271221 A1 | | 12/2005 | Cerwin |

(Continued)

FOREIGN PATENT DOCUMENTS

| | | | |
|---|---|---|---|
| JP | 2012055452 A | * | 3/2012 |
| WO | 2013150374 A1 | | 10/2013 |

(Continued)

OTHER PUBLICATIONS

Sojeong et al., "Advanced Sound Capturing Method with Adaptive Noise Reduction System for Broadcasting Multicopters", 2015 IEEE International Conference on Consumer Electronics (ICCE), Jan. 9-12, 2015, pp. 26-29.

(Continued)

*Primary Examiner* — Peter Vincent Agustin
(74) *Attorney, Agent, or Firm* — Artegis Law Group, LLP

(57) ABSTRACT

A computing system comprises a memory including instructions and a processor coupled to the memory. The processor, when executing the instructions, is configured to perform the steps of mapping, to a robotic speaker, a sound associated with a virtual object included in a virtual environment, transmitting information to the robotic speaker to cause the robotic speaker to move to a location in a physical environment that corresponds to a location of the virtual object in the virtual environment, and transmitting an audio signal to the robotic speaker. The robotic speaker outputs, based on the audio signal and at the location in the physical environment, the sound associated with the virtual object.

20 Claims, 12 Drawing Sheets

(56) References Cited

U.S. PATENT DOCUMENTS

| | | | |
|---|---|---|---|
| 2006/0254853 A1* | 11/2006 | Van Gieson | G10K 11/004 181/191 |
| 2007/0025560 A1* | 2/2007 | Asada | G10K 15/12 381/61 |
| 2007/0161425 A1* | 7/2007 | Yamaya | A63F 13/08 463/35 |
| 2007/0200027 A1 | 8/2007 | Johnson | |
| 2007/0253561 A1* | 11/2007 | Williams | H04S 7/301 381/58 |
| 2007/0274528 A1* | 11/2007 | Nakamoto | H04S 7/30 381/17 |
| 2008/0212819 A1 | 9/2008 | Cerwin et al. | |
| 2010/0201807 A1 | 8/2010 | McPherson | |
| 2013/0041648 A1* | 2/2013 | Osman | H04S 7/304 704/2 |
| 2013/0050652 A1 | 2/2013 | Wharton | |
| 2013/0166103 A1 | 6/2013 | Ko | |
| 2014/0211086 A1 | 7/2014 | Wharton et al. | |
| 2015/0078596 A1* | 3/2015 | Sprogis | H04R 5/027 381/303 |
| 2015/0293655 A1* | 10/2015 | Tan | G06F 3/0486 715/727 |
| 2015/0382128 A1* | 12/2015 | Ridihalgh | H04S 7/301 381/57 |
| 2016/0165337 A1* | 6/2016 | Trestain | H04R 1/323 381/387 |
| 2016/0375997 A1 | 12/2016 | Welsh et al. | |
| 2017/0010671 A1* | 1/2017 | Ghaffari Toiserkan | G06F 3/016 |
| 2017/0046123 A1* | 2/2017 | Song | H04S 7/30 |
| 2018/0007489 A1* | 1/2018 | Lehtiniemi | H04S 7/303 |
| 2018/0079090 A1* | 3/2018 | Koenig | B25J 18/04 |

FOREIGN PATENT DOCUMENTS

| | | |
|---|---|---|
| WO | 2014032709 A1 | 3/2014 |
| WO | 2016029469 A1 | 3/2016 |

OTHER PUBLICATIONS

Extended European Search Report for EP Application No. 16167374.4, dated Aug. 5, 2016, 7 pages.

Hovding—Airbag for urban cyclists: How it works, 11 pages, http://www.hovding.com/how_hovding_works//?p=en/how_it_works.

Warwick Mills "Protective Fabric Warwick's Material Used in Mars Landings" http://www.warwickmills.com/Protective-Fabrics-Mars.aspx.

QuadcopterHQ.com, Admin "What is a Gimbal" Dec. 2, 2013 (5 pages). http://www.warwickmills.com/Protective-Fabrics-Mars.aspx.

Woodward, Curt "Xconomist of the Week: Helen Greiner's CyPhy Works Unveils Drones" Xconomy, Inc. Dec. 3, 2012 (3 pages) http://www.warwickmills.com/Protective-Fabrics-Mars.aspx.

Grizzly Analytics home page—http://www.grizzlyanalytics.com/home.html.

Non-final Office Action for U.S. Appl. No. 14/712,835, dated Sep. 9, 2016.

Final Office Action for U.S. Appl. No. 14/712,835, dated Sep. 20, 2017.

* cited by examiner

MOBILE SPEAKER SYSTEM FOR VIRTUAL REALITY ENVIRONMENTS

FIELD OF THE VARIOUS EMBODIMENTS

The various embodiments relate generally to audio systems and, more specifically, to a mobile speaker system for virtual reality environments.

DESCRIPTION OF THE RELATED ART

A technology area of growing interest is virtual reality. Virtual reality systems immerse a user in computer-generated virtual environments that generally include various types of virtual objects and sounds generated by such virtual objects. Applications for virtual reality may include, for example, entertainment, gaming, healthcare, communications, and personnel training and development.

Conventional virtual reality technology typically includes a virtual reality headset that is worn by a user. A computing system generates virtual reality content, which includes a virtual environment that is presented to the user via the headset. The computing system may also update aspects of the virtual reality content in response to user interaction, such as interaction via a game controller or movements performed by the user himself or herself.

As noted above, the virtual environment may include any number of virtual objects that produce sound and/or affect sound within the virtual environment. Sounds associated with these virtual objects are typically outputted to the user via one or more audio devices, such as headphones, speakers included in a VR headset, and/or speakers included in the physical environment in which the user is located.

Although conventional systems are generally capable of providing dynamic audio output that includes sound effects associated with various types of objects included in a virtual environment, the outputted audio may not accurately represent various aspects of the virtual reality content. For example, in the case of a virtual object that is located a certain distance away from a user and a certain distance above the user, a conventional system that implements headphones or speakers to output audio to the user may be unable output audio such that the user perceives sound generated by the virtual object as emanating from the specific location at which the virtual object is positioned in the virtual environment.

As the foregoing illustrates, more effective techniques for generating and outputting audio associated with a virtual reality environment would be useful.

SUMMARY

One embodiment sets forth a method for mapping a sound to a robotic speaker. The method includes mapping, to a robotic speaker, a sound associated with a virtual object included in a virtual environment, transmitting information to the robotic speaker to cause the robotic speaker to move to a location in a physical environment that corresponds to a location of the virtual object in the virtual environment, and transmitting an audio signal to the robotic speaker, where the robotic speaker outputs, based on the audio signal and at the location in the physical environment, the sound associated with the virtual object.

Further embodiments provide, among other things, systems, devices, and computer-readable storage media configured to implement the method set forth above.

At least one advantage of the disclosed techniques is that audio output to a user of virtual reality content more accurately represents the virtual reality content. Particularly, the audio that the user hears matches more closely with user expectations for the audio based on what the user sees in the virtual reality content. Consequently, the audio facilitates a more immersive virtual reality experience.

BRIEF DESCRIPTION OF THE DRAWINGS

So that the manner in which the above recited features can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

System Overview

Figure 1:
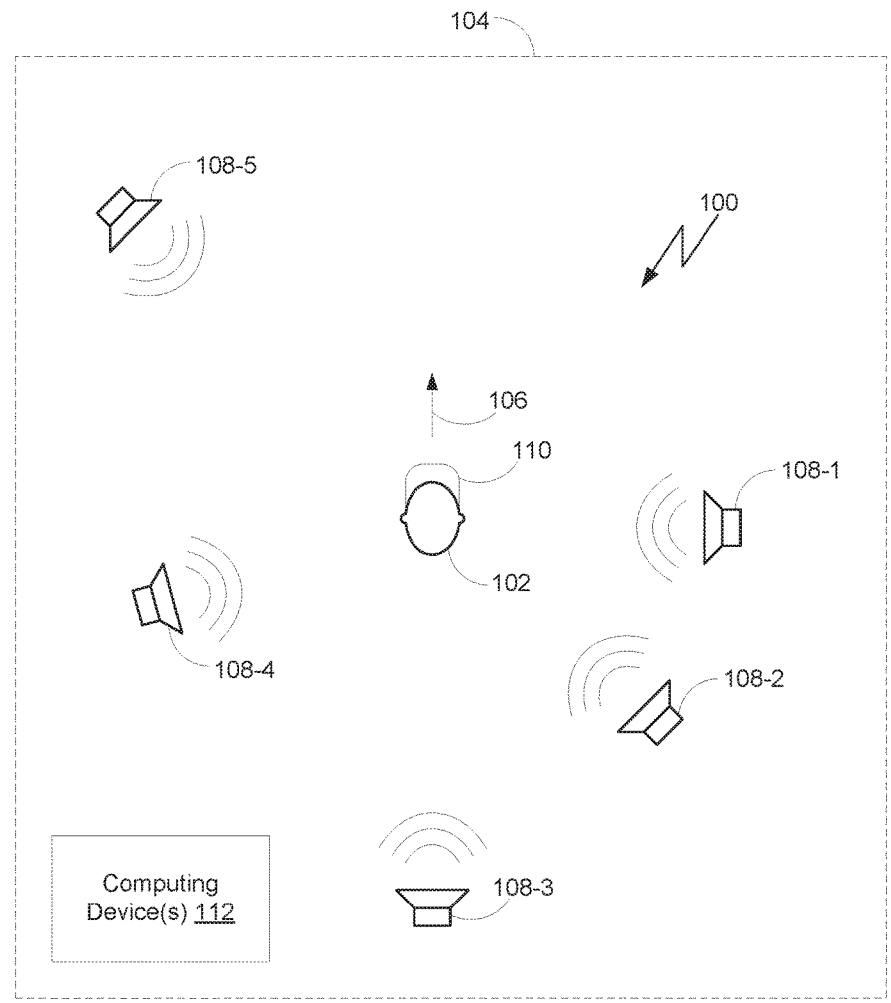
FIG. 1 is a conceptual diagram illustrating a virtual reality system that implements one or more robotic speakers, according to one or more aspects of the various embodiments.

FIG. 1 is a conceptual diagram illustrating a virtual reality system that implements one or more robotic speakers, according to one or more aspects of the various embodiments. As shown, a VR system 100 includes a VR headset 110 and one or more computing devices 112. The VR system 100 is communicatively coupled with one or more robotic speakers 108. As shown, the VR system 100, robotic speakers 108, and a user 102 are located in a physical environment 104. In various embodiments, physical environment 104 may be an open environment (e.g., an open field) or an enclosed environment (e.g., a room with walls and a ceiling). Physical environment 104 may have various acoustic characteristics based on the presence or lack of walls, a ceiling, a floor, physical objects, etc. (not shown) within the physical environment 104. It should be appreciated that, while the embodiments described herein are described as implemented with a VR system 100, the described embodiments may be implemented with any type of virtual environment computing system (e.g., an augmented reality system).

In general, VR system 100 generates VR content, such as a virtual environment including one or more virtual objects, and updates the VR content in response to input received from user 102. The VR content generally includes both visual content (e.g., virtual objects) and audio content that corresponds to the visual content (e.g., sounds produced by the virtual objects). The visual content may be displayed to user 102 via one or more display devices (e.g., one or more displays mounted in or otherwise coupled to VR headset 110). The audio content may be presented to user 102 via one or more robotic speakers 108 and, optionally, via one or more additional static audio devices (e.g., headphones, one or more speakers on the VR headset 110, one or more stationary speakers arranged in physical environment 104, etc.).

Conventional VR approaches typically output audio content via static audio devices, such as headphones that are worn by a user or stationary speakers included in a physical environment. As noted above, audio content that is outputted via static audio devices may not accurately represent the virtual environment and/or virtual objects included in the virtual environment. For example, sounds outputted by stationary speakers may not accurately reflect the distance, direction, and/or motion between the user and a virtual object included in the virtual environment.

Accordingly, in various embodiments, VR system 100 identifies one or more sounds being generated within a virtual environment and determines whether the sound(s) are candidates for being outputted via one or more robotic speakers 108. For example, a sound produced by or otherwise associated with a particular virtual object may be outputted via a robotic speaker 108 if the virtual object is a candidate for being mapped to a robotic speaker 108 and meets a set of one or more criteria, such as the virtual object being within a specified distance of a location of a user 102 within the virtual environment. If the virtual object and/or sound is a candidate for being outputted via a robotic speaker 108, and a robotic speaker 108 is available for outputting the sound, then the sound and/or the virtual object is mapped to the robotic speaker 108. The robotic speaker 108 may then be moved to a location within the physical environment 104 that corresponds to the location from which the sound is (or will be) emitted in the virtual environment. The sound is then outputted via the robotic speaker 108 in order to generate an immersive auditory environment that more accurately reflects the location, orientation, movement, etc. of the corresponding virtual object within the virtual environment.

In some embodiments, as user 102 moves or changes orientation within the virtual environment without changing location or orientation within physical environment 104 (e.g., moving or changing orientation within the virtual environment via input using gestures, a game controller, a joystick, etc.) and/or interacts with the VR content, the robotic speakers 108 may be repositioned within the physical environment 104 to reflect the updated location and/or orientation of user 102 within the virtual environment. Additionally, the robotic speakers 108 may be repositioned within the physical environment 104 to reflect the location and orientation of the virtual objects within the virtual environment, irrespective of whether user 102 has moved or changed orientation within the physical environment 104 or the location and/or orientation of user 102 within the virtual environment has changed.

As shown, VR system 100 may include one or more computing devices 112. In various embodiments, the computing device(s) 112 generate the VR content and update the VR content in response to user input. In some embodiments, the computing device(s) 112 are separate from and communicatively coupled with VR headset 110, as shown in FIG. 1. Additionally, in some embodiments, the computing device(s) 112 are integrated with and/or coupled to the VR headset 110. Examples of computing devices 112 that could be implemented with the VR system 100 are described below in further detail in conjunction with FIG. 2.

As shown, VR headset 110 is configured to be worn by a user 102 of the VR system 100. VR headset 110 may be communicatively coupled to computing device(s) 112 via a wired connection (e.g., one or more cables, connectors, etc.) and/or a wireless connection (e.g., Wi-Fi, Bluetooth, etc.). VR headset 110 may include one or more input/output devices, one or more of which may operate in conjunction with computing device(s) 112. For example, VR headset 110 may include one or more sensors (e.g., an inertial sensor, accelerometer, gyroscope, magnetometer, proximity sensor, etc.). Data from the one or more sensors may be transmitted to the computing device(s) 112, which may determine a location of user 102, motion of user 102, absolute and/or relative orientation 106 of the head of user 102 (and correspondingly, absolute and relative orientation of VR headset 110), whether the VR headset is being worn by user 102, and so forth. Additionally, VR headset 110 may include one or more visual output devices (e.g., display(s) for outputting visual content received from computing device(s) 112). VR headset 110 may further include one or more audio output devices (e.g., headphones, integrated speakers, etc. for outputting audio content received from computing device(s) 112).

As used herein, a location of user 102 in physical environment 104 may be defined in three-dimensional space along x, y, and z axes of physical environment 104. An orientation of user 102 in physical environment 104 may be defined as a direction that user 102 is facing within the three-dimensional space of physical environment 104. The orientation may be defined relative to an absolute reference frame or relative to a reference location or object in physical environment 104.

VR system 100 may include one or more input devices (not shown) coupled to the computing device(s) 112 and/or VR headset 110. For example, the VR headset 110 may include one or more input devices (e.g., buttons, switches, a touch pad, microphone, etc.) for receiving user inputs. VR system 100 may also include one or more separate controller devices (e.g., gamepad, joystick, other handheld controller device) communicatively coupled to computing device(s) 112 and/or VR headset 110 (e.g., by a wired or wireless connection) and configured to be operated by user 102. The VR system 100 may receive input from user 102 via the input devices (e.g., input interacting with the VR content, menu navigation input, voice input, volume change input). The VR system 100 may update the VR content in response to the input received via the input devices. In some embodiments, one or more of the input devices may also provide haptic feedback to user 102.

Each robotic speaker 108 may include one or more audio output devices (e.g., one or more speakers, an amplifier, etc.). The audio output devices may receive audio signals and process the audio signals (e.g., via decoding, amplification, digital signal processing, audio effects, etc.) to generate audio output, which is then outputted via one or more speakers. The audio signals may include audio content (e.g., audio content of the VR content) generated by the computing device(s) 112.

Figure 3:
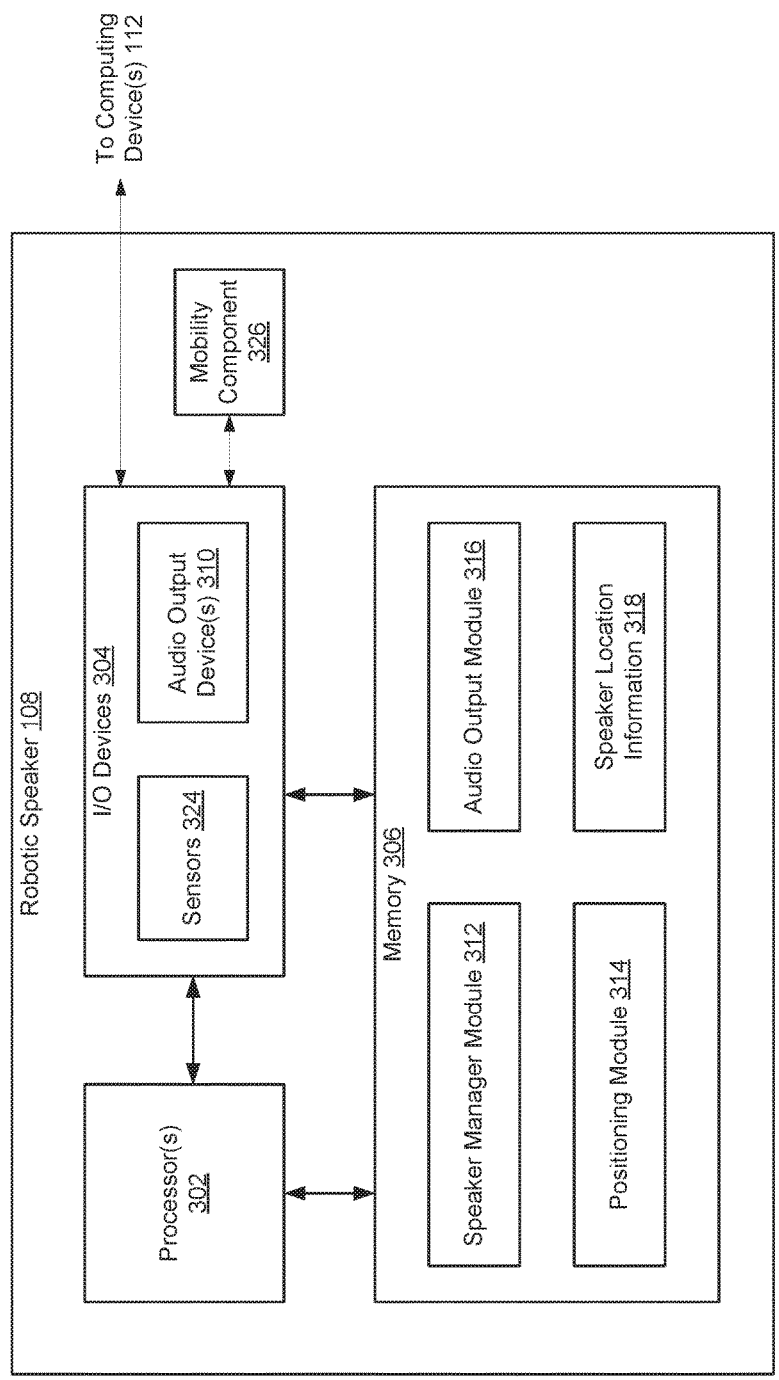
FIG. 3 is a block diagram illustrating a robotic speaker of FIG. 1, according to one or more aspects of the various embodiments.

Each robotic speaker 108 may also include a mobility component (e.g., mobility component 326, FIG. 3). The mobility component of a robotic speaker 108 may include mechanical, electrical, and/or any other suitable components capable of moving the robotic speaker 108 from one location to another and changing orientation within the physical environment 104, as described below in further detail in conjunction with FIGS. 3, 6A-6C, 7-8, and 9A-9B.

Figure 2:
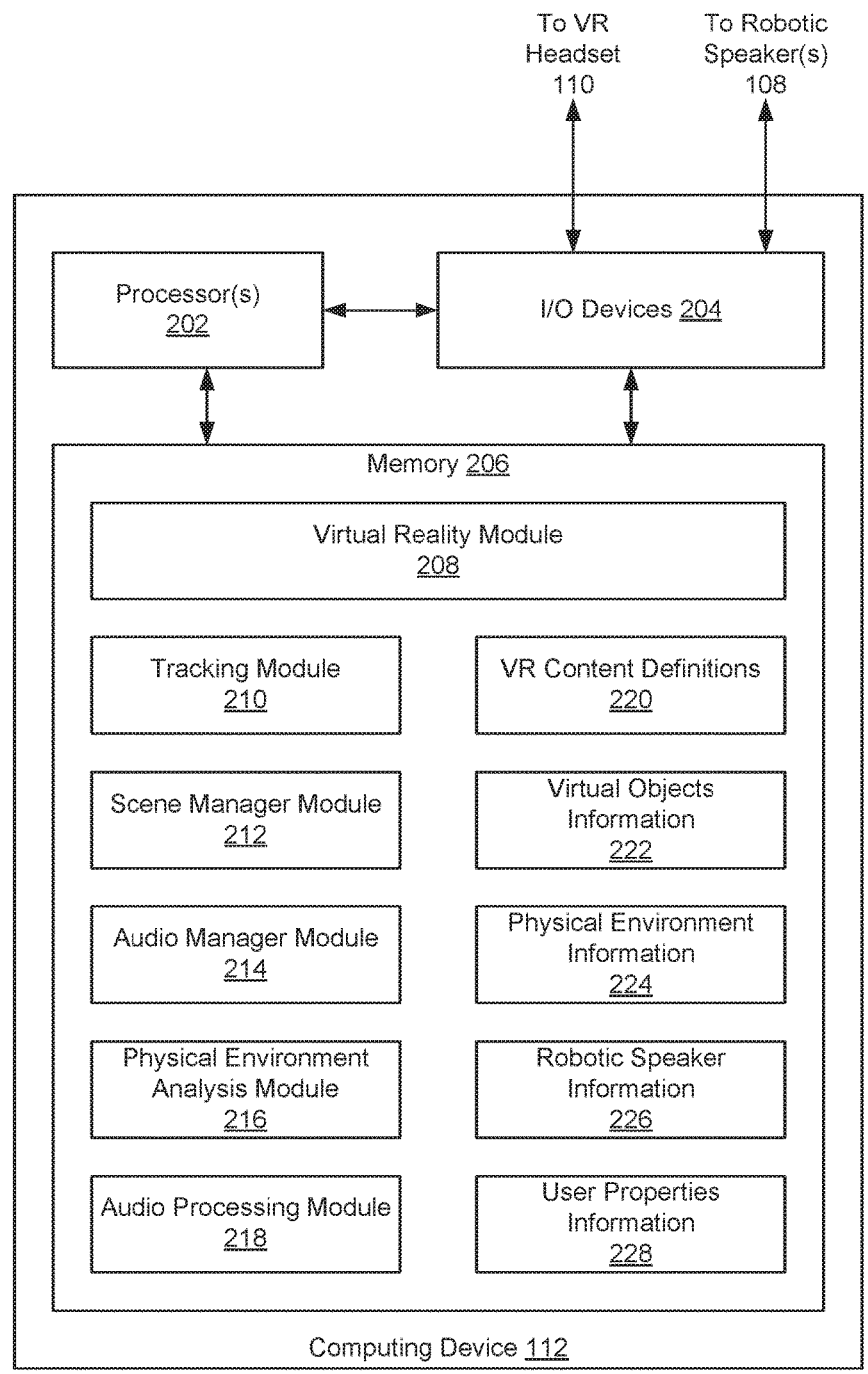
FIG. 2 is a block diagram illustrating a computing device of a virtual reality system of FIG. 1, according to one or more aspects of the various embodiments.

FIG. 2 illustrates a computing device 112 of VR system 100, according to one or more aspects of the various embodiments. In various embodiments, one or more computing device(s) 112 may be separate from and communicatively coupled with the headset 110, integrated with the headset 110, or a combination of the above. As shown, computing device 112 includes one or more processors 202, input/output (I/O) devices 204, and memory 206.

Processor(s) 202 may be any technically feasible hardware unit configured to process data and execute program instructions. Processor(s) 202 could include, for example and without limitation, a central processing unit (CPU), a graphics processing unit (GPU), an application specific integrated circuit (ASIC), an field-programmable gate array (FPGA), a digital signal processor (DSP), and any combination thereof.

I/O devices 204 may include devices for receiving input and/or providing output. For example, and without limitation, I/O devices 204 could include one or more controller devices, a keyboard, a mouse, a touchpad, one or more sensor devices (e.g., a camera, a motion sensor, accelerometer, gyroscope, magnetometer, inertial sensor, etc.), one or more microphones, headphones, and one or more static audio devices. One or more of the I/O devices 204 may be included in the VR headset 110. I/O devices 204 may further include one or more communication devices (not shown) for communication with other computing devices 112, VR headset 110, and robotic speakers 108 using any suitable communications technology (e.g., wireless communication devices, wired communication devices).

Memory 206 may include any technically feasible storage medium for storing data and software applications. Memory could include, for example, a random access memory (RAM) module, read-only memory (ROM) module, a hard disk drive, a solid state drive, flash memory, and so on.

As shown in FIG. 2, memory 206 includes a VR module 208, a tracking module 210, a scene manager module 212, an audio manager module 214, a physical environment analysis module 216, an audio processing module 218, VR content definitions 220, virtual objects information 222, physical environment information 224, robotic speaker information 226, and user properties information 228.

In operation, the VR module 208 generates VR content and updates the VR content in response to user input, such as input received via a sensor or a controller device. The VR content may include a virtual environment, one or more virtual objects, and optionally a representation of user 102 in the virtual environment. The representation of the user 102 need not be visible and may embody properties (e.g., location, motion, orientation, dimensions, etc.) assigned to user 102 in the virtual environment. The representation of user 102 may also include one or more associated virtual objects (e.g., virtual body parts), and may correspond to a character within the VR content. The VR module 208 may generate the VR content according to preset VR content definitions 220 stored in memory 206. VR content definitions 220 may include definitions of possible virtual environments, virtual objects, and user representations. In various embodiments, VR content definitions 220 may be created by the developer of the VR module 208, and may be stored as libraries or databases (e.g., libraries of object classes, databases of possible parameter ranges for properties) in memory 206 and/or pre-configured in the VR module 208 (e.g., configured within the program instructions of the VR module 208).

In some embodiments, the VR content definitions 220 may further define a priority level for mapping the virtual object and/or a sound associated with the virtual object to a robotic speaker 108. For example, VR content definitions 220 may define dogs in the VR content. The VR content definitions 220 may further define a priority level for mapping any instance of a virtual dog in the VR content to a robotic speaker 108. The priority level may be a ranking that is assigned to one or more virtual objects, an indication that the virtual object must be mapped to a robotic speaker 108, or an indication that the virtual object may never be mapped to a robotic speaker 108.

The tracking module 210 tracks user 102 and the robotic speakers 108. For example, the tracking module 210, in conjunction with one or more I/O devices 204 (e.g., one or more sensors on headset 110), determines and tracks the location and motion of user 102 and/or the head orientation 106 of user 102 in the physical environment 104. The tracking module 210 may store metadata corresponding to the location, motion, and orientation 106 of user 102 in memory 206 as user properties information 228. User properties information 228 stores metadata of properties associated with user 102 in physical environment 104. The properties associated with user 102 may include a location of user 102, detected motion of user 102 (e.g., speed and direction of motion) and orientation 106 of user 102. VR module 208 may read the user properties information 228 to determine location, motion, and orientation of user 102 within the virtual environment.

In some embodiments, tracking module 210 also determines and tracks the locations of the robotic speakers 108. For example, tracking module 210 may use one or more techniques (e.g., trilateration), in conjunction with one or more I/O devices 204 (e.g., microphone, sensors), to determine and track the locations of the robotic speakers 108. Additionally or alternatively, each robotic speaker 108 may include I/O devices (e.g., sensors 324) and/or other components that are configured to determine the location of the robotic speaker 108 within the physical environment 104 and to transmit the location to computing device 112. For example, a robotic speaker 108 may transmit speaker location information 318 (FIG. 3) to computing device 112. Tracking module 210 could then store metadata corresponding to the locations of the robotic speakers 108 in memory 206 as robotic speaker information 226. In some embodiments, tracking module 210 also tracks user 102 (e.g., by tracking the VR headset 110) and robotic speakers 108 in conjunction with one or more tracking systems (e.g., OPTI-TRACK, LIGHTHOUSE, coded light system).

In various embodiments, scene manager module 212 identifies virtual objects in the VR content generated by VR module 208. The scene manager module 212 determines properties of the virtual objects and stores metadata corresponding to the properties of the virtual objects in memory 206 as virtual objects information 222. Virtual objects information 222 includes metadata corresponding to properties of virtual objects in the virtual environment. In some embodiments, virtual objects include visible objects that constitute the virtual environment (e.g., the ground, clouds in the sky, landscape, etc.) and other virtual objects that are present in the virtual environment (e.g., animals, people, things). In some embodiments, the scene manager module 212 identifies virtual objects and determines the properties of the virtual objects by evaluating the VR content generated by VR module 208. The scene manager module 212 may evaluate the VR content periodically (e.g., every second) or continuously.

Examples of properties of a virtual object that may be determined by scene manager module 212 include, without limitation, a location of a virtual object in the virtual environment, a distance of the virtual object from a location corresponding to user 102 in the virtual environment, distances to other virtual objects (e.g., walls, etc.) in the virtual environment, shortest straight-line path (e.g., a ray-tracing path) from the virtual object to the user or another virtual object in the virtual environment, reverberation properties (e.g., a reflection coefficient, shape of the object, etc.) of the virtual object, sound absorption or masking properties (e.g., a sound absorption coefficient, etc.) of the virtual object, dimensions (e.g., length, width, height), and a shape or geometry of the virtual object (e.g., does the virtual object have a flat or jagged shape, etc.).

In various embodiments, audio manager module 214 identifies virtual objects in the VR content generated by VR module 208 (e.g., the same virtual objects identified by scene manager module 212). For a given virtual object, the audio manager module 214 obtains properties of the virtual object (e.g., from virtual objects information 222).

The audio manager module 214 determines whether the virtual object is a candidate for being mapped to a robotic speaker included in a finite number of robotic speakers 108. In some embodiments, the audio manager module 214 determines whether the virtual object is a candidate for being mapped to a robotic speaker by determining whether the virtual object produces sound and/or whether the virtual object affects sounds from other virtual objects. In some embodiments, VR content definitions 220 or virtual objects information 222 may define whether a virtual object produces sounds (e.g., a virtual person speaking, a virtual dog barking, a virtual ocean making wave sounds) or affects sounds produced by other virtual objects. For example, a virtual object may affect sounds by reflecting sounds (e.g., a wall reflecting sounds) or masking sounds (e.g., a window or door may mask or muffle sounds passing through). In some embodiments, if a virtual object is determined to produce sounds and/or affect sounds, then the virtual object is determined to be a candidate for being mapped to a robotic speaker 108. In some embodiments, VR content definitions 220 or virtual objects information 222 may indicate that a virtual object is a candidate for being mapped to a robotic speaker, regardless of whether the virtual object produces or affects sounds.

If a virtual object is determined to be a candidate for being mapped to a robotic speaker 108, then the audio manager module 214 identifies sounds produced or affected by the virtual object. The audio manager module 214 may then evaluate properties of the identified sounds and/or properties of the virtual object (e.g., from virtual objects information 222) to determine whether the sounds and/or the virtual object meet a set of one or more criteria for mapping the virtual object to a robotic speaker 108. If the sound and/or virtual object is determined to meet the set of criteria, then the virtual object and/or the sound may be mapped to a robotic speaker 108.

In some embodiments, the audio manager module 214 evaluates properties of the virtual object and properties of the sounds to determine whether the sounds and/or virtual object meet the set of criteria. Examples of the criteria include, without limitation, whether the virtual object is within a threshold distance range from user 102 within the virtual environment, whether the sound is within a predefined frequency range, whether the virtual object has been predefined as requiring a mapping to a robotic speaker 108, and whether the virtual object produces a particular type of the sound.

In some embodiments, a criterion for mapping to a robotic speaker 108 is whether the virtual object is within a threshold distance range from the location of the user within the virtual environment. The audio manager module 214 may determine that a virtual object is outside of the threshold distance range if the virtual object is too far from, or too close to, the location of the user. Sounds that are too far away from the location of the user may be omitted from output and/or may be output via one or more static audio devices (e.g., stationary speakers), and sounds that are too close to the location of the user may be output via one or more static audio devices (e.g., headphones). If the audio manager module 214 determines that a virtual object is outside of the threshold distance range, then the virtual object does not meet this criterion.

In some embodiments, another criterion for mapping to a robotic speaker 108 is whether the sound is within a threshold frequency range. The audio manager module 214 may determine that a sound is outside of the threshold frequency range if the sound has a frequency that is not within the threshold frequency range. Sounds outside of the threshold frequency range may have little or no perceivable difference to a user when output by a static audio device as compared to a robotic speaker 108. Thus, a sound outside of the threshold frequency range may be output by a static audio device instead of a robotic speaker 108. If the audio manager module 214 determines that a sound is outside of the threshold frequency range, then the sound does not meet this criterion.

In some embodiments, another criterion for mapping to a robotic speaker 108 is whether the virtual object has been predefined as requiring a mapping to a robotic speaker 108. The audio manager module 214 may determine that a virtual object has been predefined by the developer (e.g., within VR content definitions 220) as requiring mapping of the virtual object to a robotic speaker 108. A virtual object may be predefined by the developer as requiring a mapping to one or more robotic speakers 108 based on the importance of the virtual object within the VR content. If the audio manager module 214 determines that a virtual object is predefined as requiring a mapping to a robotic speaker 108, then the virtual object meets the set of criteria for mapping.

In some embodiments, another criterion for mapping to a robotic speaker 108 is a type of the sound within the VR content and/or the type of virtual object producing the sound within the VR content. That is, certain sounds are more suitable for output via a robotic speaker 108. For example, in VR content involving a first-person shooter game, sounds from an enemy character may be considered relatively more important and, thus, more suitable for output via a robotic speaker 108, than ambient sounds from other objects in the virtual environment (e.g., the sound of a river flowing). If the audio manager module 214 determines that the enemy character sounds are more important than the sounds from an object in the environment, then the audio manager module 214 may determine that the enemy character sounds meets the criterion and that the sounds from the object in the environment (e.g., the river flow) do not meet the criterion. In some embodiments, the audio manager module 214 may determine that the sounds from the object in the environment meets the criterion, but have lower priority than the enemy character sounds.

As another example, speech from a character may be more suitable for output via a robotic speaker 108 than speech corresponding to an inner monologue from the user representation, because a sense of space and distance is generally not required for an inner monologue. The audio manager module 214 may determine that the speech from the character meets the criterion and that the inner monologue does not meet the criterion. In some embodiments, the audio manager module 214 may determine that the inner monologue meets the criterion, but has lower priority than the speech from the character.

As a further example, speech from a main character may be considered more important and, thus, more suitable for output via a robotic speaker 108, than speech from a side character. The audio manager module 214 may determine that the speech from the main character meets the criterion. The audio manager module 216 may determine that the speech from the side character also meets the criterion, but has lower priority than the speech from the main character.

In some embodiments, the audio manager module 214 also determines a priority for the sounds and/or virtual object based on the set of criteria. The audio manager module 214 may prioritize or deprioritize a virtual object for mapping to a robotic speaker 108 based on the set of criteria. For example, a virtual object that is closer to the user, but still within the threshold distance range, may have priority over a virtual object that is farther away from the user but still within the threshold distance range. As a further example, if the VR content corresponds to a virtual conference held in a virtual rainforest, speech from the conference participants may have priority over ambient sounds from objects in the virtual rainforest because the speech from the participants is more important than ambient sounds associated with the environment. If a virtual object is predefined to require mapping to a robotic speaker 108, then the audio manager module 214 may determine that the virtual object has the highest priority.

If the sounds and/or the virtual object meet the set of criteria, and a robotic speaker 108 is available for mapping, then the virtual object and/or the sound is mapped to the robotic speaker 108. If no robotic speaker 108 is available for mapping (e.g., all robotic speakers 108 have already been mapped to virtual objects), then the audio manager module 214 may determine whether the sounds and/or virtual object have priority over another virtual object that is already mapped to a robotic speaker 108. If the audio manager module 214 determines that the sounds and/or virtual object have priority over the other virtual object that is already mapped to a robotic speaker 108, then the audio manager module 214 may remove the current mapping and generate a new mapping between the higher priority sounds and/or virtual object and the robotic speaker 108.

In some embodiments, the mappings of virtual objects and/or sounds associated with the virtual object to robotic speakers are dynamic and change over time. For example, whether a particular virtual object and/or the sounds produced or affected by the virtual object meets the set of criteria may change over time as the VR content is updated. If a virtual object that is mapped to a robotic speaker 108 no longer meets the set of criteria, then the audio manager module 214 may remove that mapping and/or replace that mapping with a mapping between a higher priority virtual object and the robotic speaker 108. In some embodiments, the audio manager module 214 continuously determines how virtual objects and/or sounds associated with the virtual objects are mapped to robotic speakers 108 and whether any mappings should be removed or replaced.

In some embodiments, multiple virtual objects and/or sounds associated with the multiple virtual objects may be mapped to the same robotic speaker 108. For example, a character speaking within the virtual environment may be heard through a window that muffles the character's speech. In such situations, both the character (as the producer of the sound) and the window (as the object affecting the sound) may be mapped to the same robotic speaker 108.

In some embodiments, the same virtual object and/or sounds associated with the same virtual object may be mapped to multiple robotic speakers 108. For example, an ocean in the virtual environment may produce sounds corresponding to a moving wave. The ocean may be mapped to multiple robotic speakers 108, and the multiple robotic speakers 108 may form a line array of robotic speakers. Output of a wave sound may start at a first robotic speaker in the array and then move to the other robotic speakers 108 in the array as the wave moves within the virtual environment. An example of a line array of robotic speakers 108 is described below in conjunction with FIG. 7.

In some embodiments, the audio manager module 214 may also determine, for one or more virtual objects and/or sounds associated with the one or more virtual objects mapped to robotic speakers 108, one or more processing operations to be applied to audio signals that correspond to sounds generated or affected by the virtual objects. Examples of processing operations include amplitude adjustment, equalization, spatialization, and/or other types of audio effects (e.g., reverberation). The audio manager module 214 may determine the processing operation(s) to be applied based on virtual objects information 222 (e.g., distance between the virtual object and the user, reflectivity or absorption coefficient of a virtual wall, etc.), physical environment information 224 (e.g., presence or lack of walls in the physical environment 104), robotic speaker information 226 (e.g., locations of robotic speakers 108 relative to user 102), and user properties information 228 (e.g., location and/or orientation of user 102). The audio manager module 214 may instruct audio processing module 218 to process, in conjunction with one or more processors 202 (e.g., a digital signal processor), the audio signals corresponding to sounds generated or affected by the virtual objects according to the determined processing operations.

For example, the audio manager module 214 may compare the distance between a virtual object and the location corresponding to user 102 within the virtual environment with the distance between a mapped robotic speaker 108 and user 102. The audio manager module 214 may determine one or more processing operations (e.g., adjusting equalization, amplitude, and/or reverberation) on the audio signals to reconcile the distances. The audio signals are processed in accordance with the processing operations so that, when audio corresponding to the audio signals is output via the robotic speaker 108, the audio is perceived by user 102 as coming from substantially the same distance as the distance between the virtual object and the location corresponding to user 102 within the virtual environment.

The audio manager module 214 may further determine, for one or more virtual objects and/or sounds associated with the one or more virtual objects that have been mapped to robotic speaker(s) 108, target locations and orientations in physical environment 104 at which the robotic speaker(s) 108 are to be positioned. The audio manager module 214 may access the robotic speaker information 226 to determine a current location of each robotic speaker 108, determine a target location and orientation for each robotic speaker 108, and transmit the target location(s) to the robotic speaker(s) 108.

In some embodiments, the audio manager module 214 may cause sounds and/or virtual objects that do not meet the set of criteria to be outputted via conventional techniques for VR audio output (e.g., output via static audio devices). Such sounds may be output via one or more static audio devices.

For example, user 102 may be using VR system 100 in a physical environment 104 that is a small room. VR system 100 generates for user 102 VR content that includes a large auditorium and a virtual person adjacent to the user 102, with the location of the user 102 being in the center of the auditorium. The virtual person claps in the virtual auditorium. The sound of the clap itself may be output via a static audio device (e.g., headphones, speakers on VR headset 110) because of the short distance between the virtual person and the user. The sound of the clap may be reflected by the walls of the virtual auditorium. The audio manager module 214 may further determine that the walls are candidates for mapping to robotic speakers 108 by virtue of the walls being virtual objects that affect the sound of the clap. The audio manager module 214 may determine that the reflected sound of the clap and/or the walls meet the set of criteria for mapping to a robotic speaker 108. The audio manager module 214 may then map the walls to respective robotic speakers 108. The audio manager module 214 may further determine, based at least on virtual objects information 222, physical environment information 224, robotic speaker information 226, and user information 228, that the distances between the walls to the user in the virtual auditorium is longer than the distance between the robotic speakers 108 and user 102 in the physical environment 104. Accordingly, the audio manager module 214 may determine one or more processing operations to apply to audio signals corresponding to the sound reflections by the walls that accounts for the difference in the distances, as well as ensuring that the corresponding audio output is perceived by the user as being a reflection of sound (e.g., an echo). In this manner, audio signals that are output via the robotic speakers 108 correlate more closely to the distance between the walls and the user location in the virtual auditorium. The audio manager module 214 may further instruct the robotic speaker(s) 108 to move to respective target locations and/or orientations to more closely correlate with the location(s), direction(s), etc. of the walls relative to the user.

Physical environment analysis module 216 may determine one or more properties (e.g., dimensions, locations of physical objects, distances to the physical objects, etc.) of the physical environment 104 and analyze the properties to determine acoustic characteristics of the physical environment 104. In some embodiments, physical environment analysis module 216 may determine, via one or more I/O devices 204 and/or I/O devices 304 (e.g., sensors 324 on the robotic speakers 108), the properties of the physical environment 104. In some further embodiments, the properties of physical environment 104 may be obtained from a separate room acoustics analysis system (not shown) and/or user entry. Metadata corresponding to the properties of the physical environment 104 may be stored in memory 206 as physical environment information 224. The physical environment analysis module 216 may analyze the physical environment information 224 to determine the acoustic characteristics of the physical environment 104. For example, the physical environment analysis module 216 may determine a reflectivity of the walls of the physical environment 104 from the physical environment information 224. Alternatively, acoustic characteristics of the physical environment 104 may be obtained from the room acoustics analysis system and/or from user entry.

Audio processing module 218 processes audio signals corresponding to sounds associated with virtual objects mapped to robotic speakers 108. The audio processing module 218 performs processing operations determined by audio manager module 214 on the audio signals. In some embodiments, the processing is performed in conjunction with one or more of the processors 202 (e.g., a digital signal processor). The audio signals are then transmitted to the robotic speakers 108 for output. In some embodiments, audio processing module 218 is included in audio manager module 214, and, thus, the audio manager module 214 determines the processing operations, performs the processing operations on the audio signals, and transmits the processed audio signals to the robotic speakers 108.

In some embodiments, VR system 100 may include multiple computing devices 112. Functionality of VR system 100 (e.g., as represented by the modules stored in memory 206) and information stored in memory 206 may be divided amongst the multiple devices 112. For example, a first computing device 112 may include virtual reality module 208, scene manager module 212, VR content definitions 220, and virtual objects information 222. A second computing device 112 may include the tracking module 210, audio manager module 214, physical environment analysis module 216, audio processing module 218, physical environment information 224, robotic speaker information 226, and user properties information 228. The first computing device 112 may provide virtual objects information 222 to the second computing device 112 (e.g., to the audio manager module 214). The robotic speakers 108 may be communicatively coupled with at least the second computing device 112, and optionally with the first computing device 112 as well.

FIG. 3 illustrates a robotic speaker 108, according to one or more aspects of the various embodiments. As shown, a robotic speaker 108 includes one or more processors 302, input/output (I/O) devices 304, and memory 306.

Processor(s) 302 may be any technically feasible hardware unit configured to process data and execute program instructions. Processor(s) 302 could include, for example and without limitation, a central processing unit (CPU), a graphics processing unit (GPU), an application specific integrated circuit (ASIC), a field-programmable gate array (FPGA), a digital signal processor (DSP), or any combination thereof.

I/O devices 304 may include devices for receiving input and/or providing output. For example, and without limitation, I/O devices 304 could include one or more sensors 324 (e.g., accelerometer, gyroscope, inertial sensor, etc.) and/or one or more audio output devices 310. In some embodiments, sensors 324 include one or more of an ultrasonic range finder, laser distance measurement device, optical sensor, RF sensor, and Bluetooth sensor (e.g., Bluetooth Low Energy sensor). I/O devices 304 may further include one or more communication devices (not shown) for communicating with computing device(s) 112 in the VR system 100, VR headset 110, and/or other robotic speakers 108 (e.g., wireless communication devices). In some embodiments, the robotic speaker 108 may communicate with computing devices 112, VR headset 110, and other robotic speakers 108 via any suitable wireless communication technology (e.g., Wi-Fi, Bluetooth).

The mobility component 326 moves and changes the orientation of the robotic speaker 108 within the physical environment 104. In general, the mobility component 326 may include any type of mechanical, electrical, fluid, airflow generating, and/or any other suitable components for moving and/or rotating the robotic speaker 108 within physical environment 104. The mobility component 326 may move and reorient the robotic speaker 108 in accordance with instructions and/or a target location from a computing device 112. The mobility component 326 may change the location of the robotic speaker 108 with respect to the x, y, and/or z dimensions and reorient the robotic speaker 108 in any suitable direction in three-dimensional space. In various embodiments, the mobility component 326 is holonomic, capable of moving the robotic speaker 108 freely in all directions on at least the x and y dimensions. Detailed examples of mobility components and movement of a robotic speaker 108 are described below in conjunction with FIGS. 6A-9B.

Audio output devices 310 output audio corresponding to audio signals received from computing devices 112. Audio output devices 310 may include one or more speakers and additionally one or more of a decoder (e.g., an analog to digital converter), an amplifier, and a pre-amplifier.

Memory 306 may include any technically feasible storage medium for storing data and software applications. Memory could include, for example, a random access memory (RAM) module, read-only memory (ROM) module, a hard disk drive, a solid state drive, flash memory, and so on. As shown in FIG. 3, memory 306 includes a speaker manager module 312, positioning module 314, audio output module 316, and speaker location information 318.

In operation, speaker manager module 312 tracks the current location of the robotic speaker 108. The speaker manager module 312, in conjunction with sensors 324, determines the current location of the robotic speaker 108. The speaker manager module 312 stores metadata corresponding to the current location of the robotic speaker 108 in memory 306 as speaker location information 318. In some embodiments, the speaker manager module 312 may also track a distance between the robot speaker 108 and user 102 via the one or more sensors 324 and store metadata corresponding to the distance in speaker location information 318. The speaker manager module 312 may transmit speaker location information 318 to computing device 112.

In some embodiments, the speaker manager module 312 receives tracking information on user 102 and robotic speakers 108 (e.g., user properties information 228 and robotic speaker information 226 generated by tracking module 210) from computing device 112. The speaker manager module 312 thus can obtain the location of user 102 and other robotic speakers 108 within the physical environment 104, aiding in movement of the robotic speaker 108 in the physical environment 104.

Positioning module 314 directs movement of the robotic speaker 108. The positioning module 314 may, for example, control movement of the robotic speaker 108 within physical environment 108 by controlling mobility component 326. The positioning module 314 may also detect, via sensors 324, obstacles (e.g., other robotic speakers 108 and other objects in physical environment 108) that the robotic speakers 108 should avoid while moving within physical environment 104. In some embodiments, positioning module 314 may include sub-modules or sub-routines for avoiding obstacles in physical environment 104 (e.g., other robotic speakers 108, other objects). Positioning module 314 may also include control loop feedback functionality (e.g., proportional-integral-derivative (PID) loop functionality) for continuous control of movement of robotic speaker 108 and obstacle detection. In some embodiments, positioning module 314 may include specialized robotics movement modules (e.g., the ROBOT OPERATING SYSTEM).

Audio output module 316 may perform, in conjunction with audio output devices 310, one or more operations on audio signals to output audio to user 102 via the one or more speakers of the audio output devices 310. In some embodiments, the operations include decoding audio signals, amplifying the audio signals, and converting the audio signals into audio.

In various embodiments, in operation, a robotic speaker 108 receives audio signals and a target location from computing device 112. The speaker manager module 312 receives the target location and directs the positioning module 314 to actuate the mobility component 326 in order to move the robotic speaker 108 from the current location to the target location. The positioning module 314 actuates the mobility component 326 to move the robotic speaker 108 to the target location. The audio output module 316 performs one or more operations on the audio signals for output when the robotic speaker 108 is positioned at the target location.

In some embodiments, a robotic speaker 108 may output audio while moving to a target location. For example, if the VR content includes a virtual character speaking while moving, the robotic speaker 108 to which the virtual character is mapped may output audio corresponding to the speech of the virtual character as the robotic speaker 108 is moving.

In some embodiments, certain modules shown as included in computing device 112 in FIG. 2 may instead be included in a robotic speaker 108. For example, each robotic speaker 108 may include an audio processing module similar to audio processing module 218 (and audio processing module 218 may optionally be omitted from computing device 112). The audio processing module at a robotic speaker 108 may be included in memory 306 (e.g., in audio output module 316 or as a separate module). In such embodiments, the audio manager module 214 determines the processing operations for audio signals as described above in conjunction with FIG. 2. The audio manager module 214 may then communicate the processing operations to be performed (e.g., instructions on what processing operations to perform) and corresponding audio signals to the robotic speakers 108. The audio processing module at the robotic speaker 108 performs the processing operations on the audio signals in accordance with the communications from the audio manager module 214.

Figure 4:
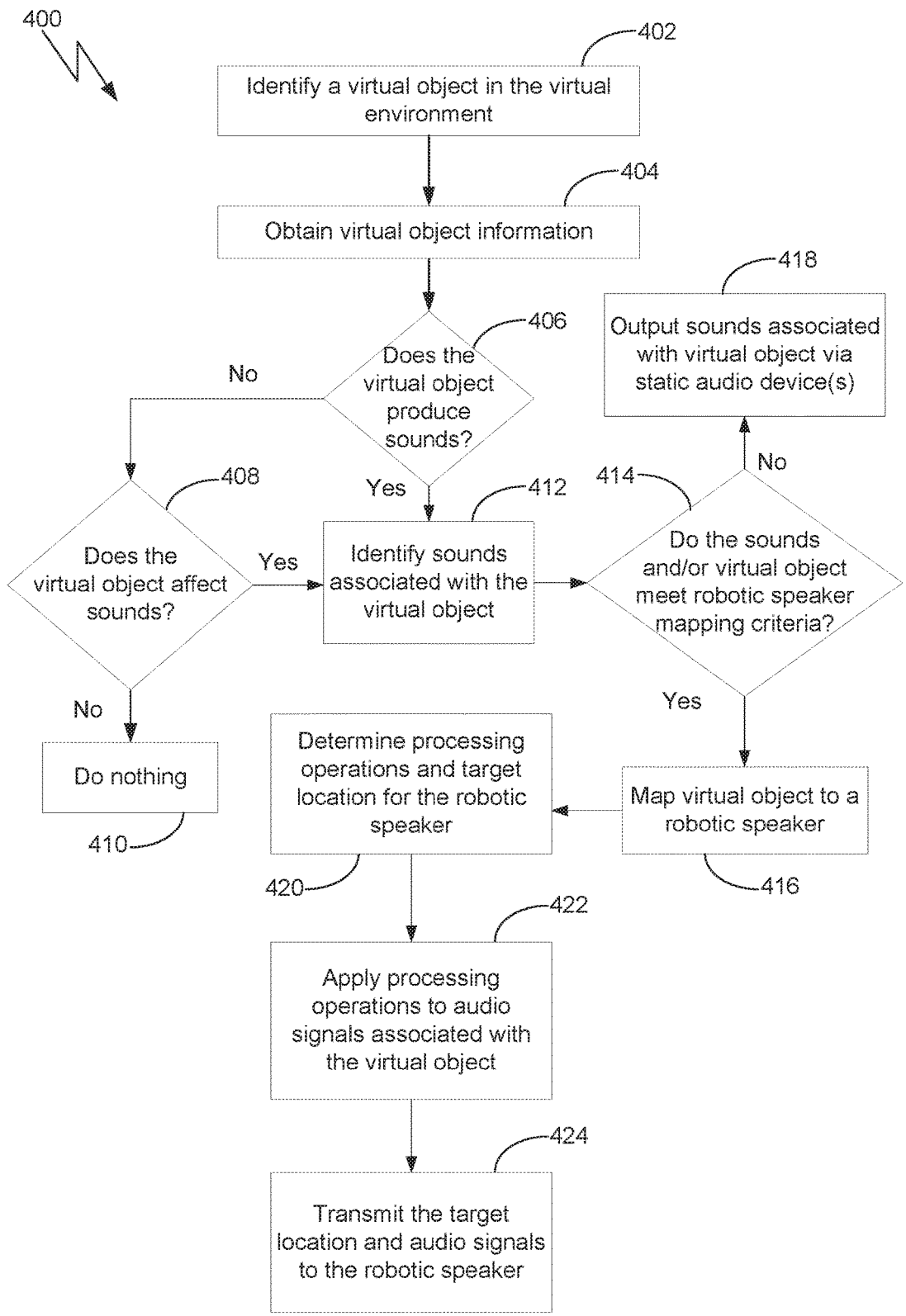
FIG. 4 is a flow diagram of method steps for mapping a virtual object to a robotic speaker, according to one or more aspects of the various embodiments.

FIG. 4 is a flow diagram of method steps for mapping one or more virtual objects to one or more robotic speakers 108, in accordance with some embodiments. Although the method steps are described with respect to the system of FIG. 2, persons skilled in the art will understand that any system configured to implement the method steps, in any order, falls within the scope of the contemplated embodiments.

As shown, a method 400 begins at step 402, where an audio manager module 214 of computing device 112 identifies a virtual object included in a virtual environment. The virtual object and virtual environment are included in VR content generated by VR module 208. At step 404, the audio manager module 214 obtains information associated with the virtual object. For example, the audio manager module 214 may obtain the virtual object information from virtual objects information 222.

At step 406, the audio manager module 214 determines whether the virtual object produces sound in the virtual environment. If, at step 406, the audio manager module 214 determines that the virtual object produces sounds, then the method 400 proceeds to step 412. If, at step 406, the audio manager module 214 determines that the virtual object does not produce sounds, then the method 400 proceeds to step 408.

At step 408, the audio manager module 214 determines whether the virtual object affects sound in the virtual environment (e.g., sounds generated by other virtual objects). If, at step 408, the audio manager module 214 determines that the virtual object affects sound in the virtual environment, then the method 400 proceeds to step 412. If, at step 408, the audio manager module 214 determines that the virtual object does not affect sound in the virtual environment, then the method 400 proceeds to step 410, where the audio manager module 214 disregards the virtual object. For example, at step 410, the audio manager module 214 would not map the virtual object to any robotic speaker 108.

At step 412, the audio manger module 214 identifies sounds that are associated with the virtual object. A sound may be associated with the virtual object if the sound is produced by the virtual object or is affected (e.g., reflected, muffled) by the virtual object. At step 414, the audio manager module 214 determines whether the sounds and/or the virtual object meet a set of one or more robotic speaker mapping criteria. If, at step 414, the audio manager module 214 determines that the sounds and/or virtual object does not meet the set of criteria, then the method 400 proceeds to step 418, where the audio manager module 214 outputs sounds associated with the virtual object via one or more static audio devices. Sounds that are associated with a virtual object, but which are not mapped to a robotic speaker 108, may be output via one or more static audio devices (e.g., headphones, speakers on VR headset 110, stationary speakers around user 102 in physical environment 104).

If, at step 414, the audio manager module 214 determines that the sounds and/or virtual object meets the set of criteria, then the method 400 proceeds to step 416, where the audio manager module 214 maps the virtual object and/or sounds associated with the virtual object to a robotic speaker 108. At step 420, the audio manager module 214 determines a target location for the robotic speaker 108 and, optionally, one or more processing operations. At step 422, the audio processing module 218 applies the processing operations determined at step 420 to audio signals associated with the virtual object. At step 424, the audio manager module 214 transmits the audio signals and the target location to the robotic speaker 108.

Figure 5:
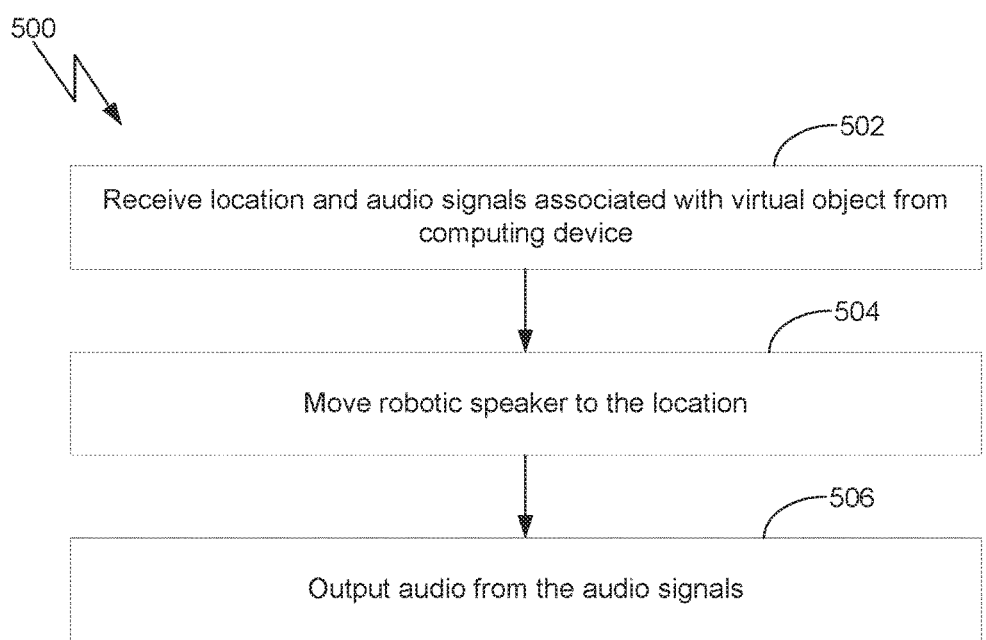
FIG. 5 is a flow diagram of method steps for outputting audio associated with a virtual object via a robotic speaker, according to one or more aspects of the various embodiments.

FIG. 5 is a flow diagram of method steps for outputting audio associated with a virtual object via a robotic speaker, in accordance with some embodiments. Although the method steps are described with respect to the system of FIG. 3, persons skilled in the art will understand that any system configured to implement the method steps, in any order, falls within the scope of the contemplated embodiments.

As shown, a method 500 begins at step 502, where a robotic speaker 108 receives, via speaker manager module 312, a target location and audio signals associated with a virtual object. At step 504, a positioning module 314 of the robotic speaker 108 causes the robotic speaker 108 to move, via mobility component 326, to the target location. At step 506, an audio output module 316 of the robotic speaker 108 outputs audio corresponding to the audio signals via audio output device(s) 310. In some embodiments, the robotic speaker 108 performs (e.g., via audio output module 216 or a separate audio processing module) one or more processing operations determined by the audio manager module 214 on the audio signals prior to outputting the audio corresponding to the audio signals. The robotic speaker 108 may perform the processing operations on the audio signals in lieu of the computing device 112 as in step 422 described above.

Figure 6A:
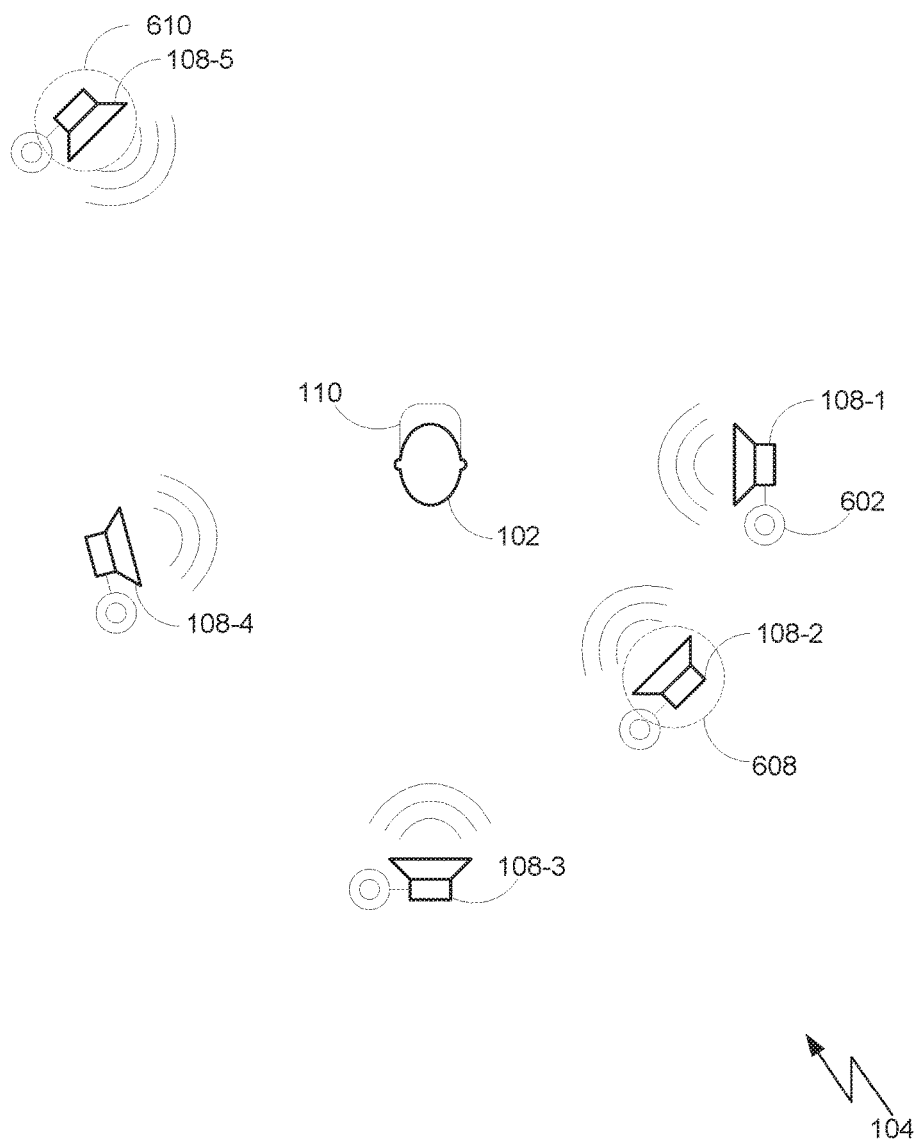
FIGS. 6A-6C is a diagram illustrating techniques for outputting sound associated with a virtual object via robotic speakers having wheels, according to one or more aspects of the various embodiments.
Figure 6B:
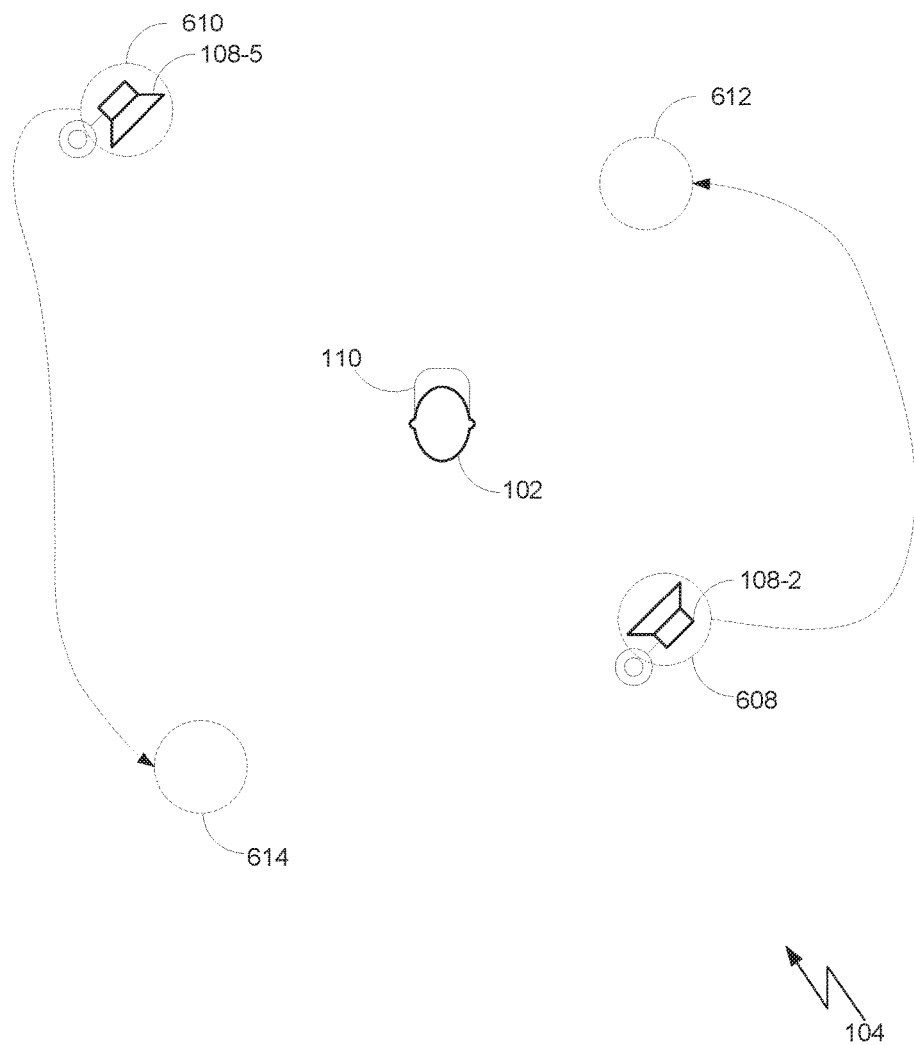
Figure 6C:
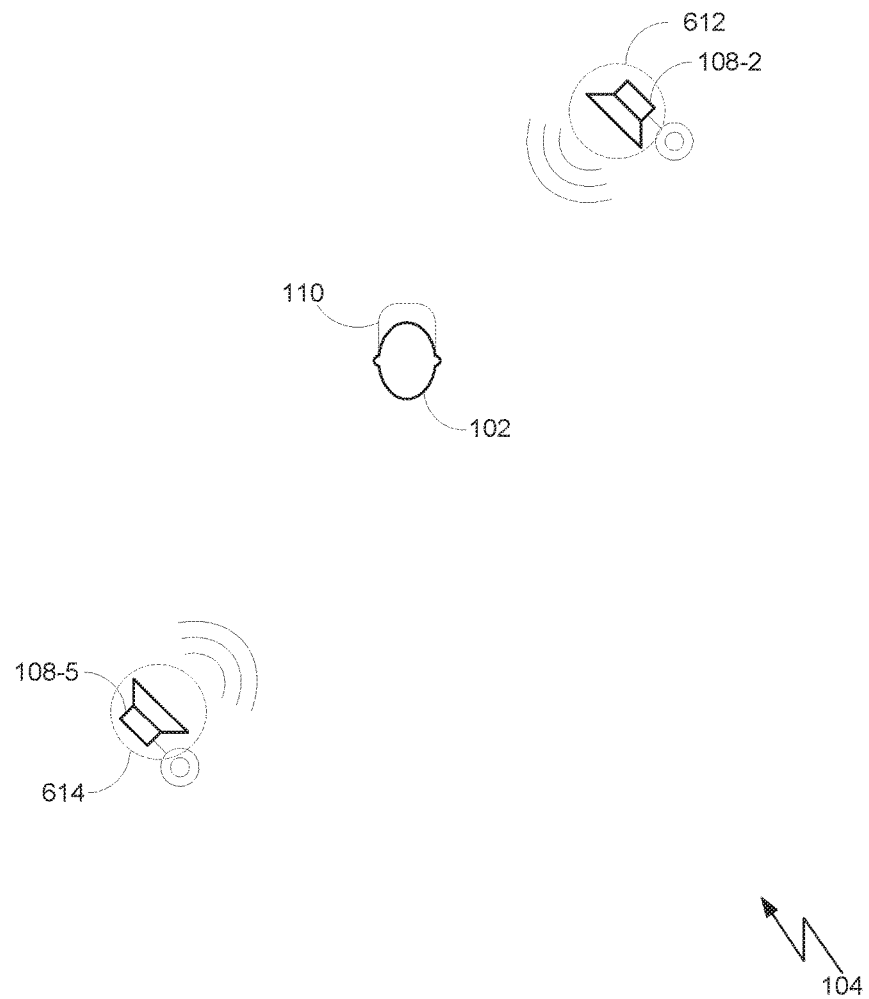

FIGS. 6A-6C is a diagram illustrating techniques for outputting sound associated with a virtual object via robotic speakers having wheels, according to one or more aspects of the various embodiments. As shown, physical environment 104 includes robotic speakers 108-1 thru 108-5 arranged around user 102 wearing VR headset 110. For example, robotic speaker 108-2 is located at location 608, and robotic speaker 108-5 is located at location 610. Each robotic speaker 108 is oriented toward user 102. A robotic speaker 108 may output sound at the location in physical environment 104 as shown in FIG. 6A. Each of the robotic speakers 108 includes a mobility component 326 that includes one or more wheels 602. Although the embodiments discussed below are described in conjunction with wheels, the techniques are applicable to any type of mobility component 326.

Each of the robotic speakers 108 may move around in physical environment 104 via one or more wheels 602. For example, as shown in FIG. 6B, robotic speaker 108-2 may move from location 608 to target location 612, and robotic speaker 108-5 may move from location 610 to target location 614. The paths robotic speakers 108-2 and 108-5 travel to reach their respective target locations need not be a straight-line path, as the straight-line path may include obstacles to be avoided.

In various embodiments, a robotic speaker 108 may move to a target location because the location and/or orientation, relative to user 102 within the virtual environment, of the virtual object that is mapped to the robotic speaker 108 has changed, or because a different virtual object has been mapped to the robotic speaker 108. The robotic speaker 108 may move and/or change orientation to match the updated location and/or orientation of the virtual object or match the location and/orientation of the newly mapped virtual object.

As shown in FIG. 6C, robotic speakers 108-2 and 108-5 have reached target locations 612 and 614, respectively. At locations 612 and 614, respectively, robotic speakers 108-2 and 108-5 output audio associated with virtual objects mapped respectively to robotic speakers 108-2 and 108-5. In some embodiments, the robotic speakers 108-2 and 108-5 may output sound associated with the virtual objects respectively to robotic speakers 108-2 and 108-5 while moving to the target locations, in accordance with the VR content generated by computing device 112 (not shown in FIGS. 6A-6C).

Figure 7:
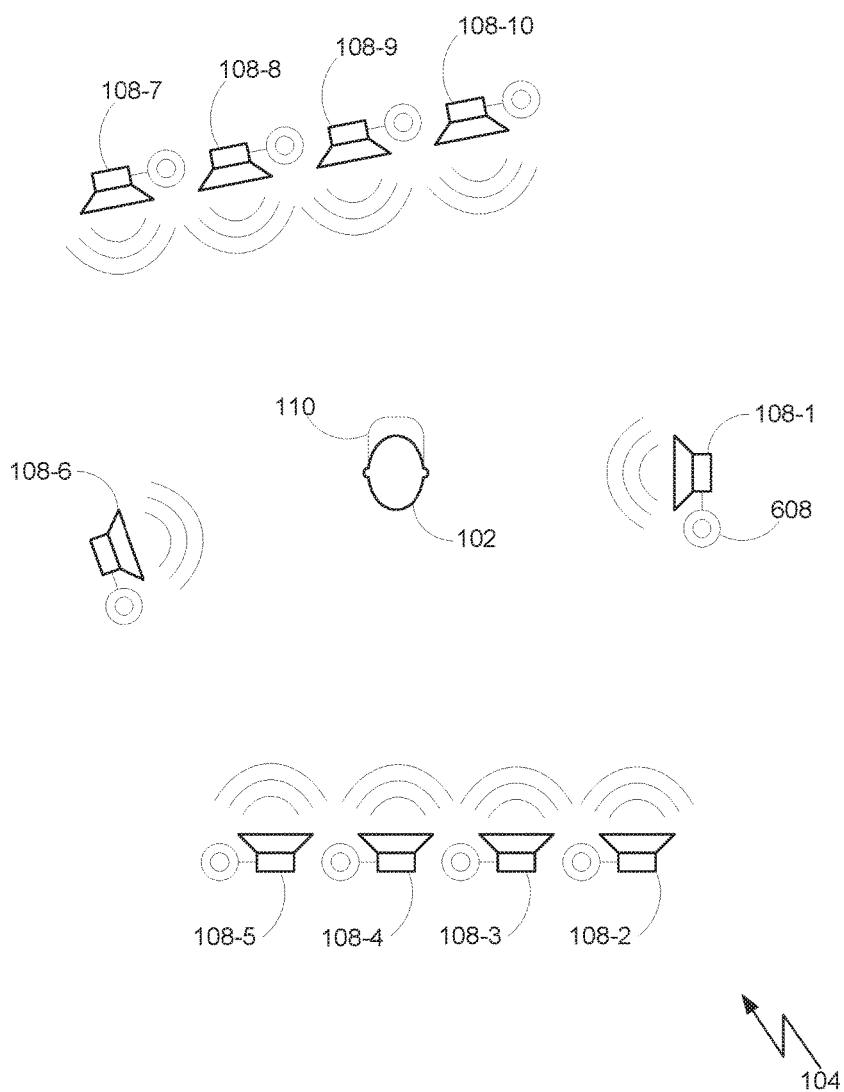
FIG. 7 is a diagram illustrating a plurality of robotic speakers, two or more of which may be arranged in one or more line arrays, according to one or more aspects of the various embodiments.

FIG. 7 is a diagram illustrating a plurality of robotic speakers, two or more of which may be arranged in one or more line arrays, according to one or more aspects of the various embodiments. As shown in FIG. 7, physical environment 104 may include robotic speakers 108-1 thru 108-10 arranged around a user 102 wearing VR headset 110. Robotic speakers 108-2, 108-3, 108-4, and 108-5 are arranged in a first line array of robotic speakers. A first virtual object may be mapped to robotic speakers 108-2, 108-3, 108-4, and 108-5. Robotic speakers 108-7, 108-8, 108-9, and 108-10 are arranged in a second line array of robotic speakers. A second virtual object may be mapped to robotic speakers 108-7, 108-8, 108-9, and 108-10. Robotic speakers 108 have mobility components 326 that include wheels 608. The robotic speakers 108 may move around and form any number of line arrays of robotic speakers 108.

In various embodiments, a moving sound (e.g., sound of wind, sound of an ocean wave, sound of a vehicle passing by user 102) associated with the first virtual object may be output via the first line array of robotic speakers 108-2, 108-3, 108-4, and 108-5. In such embodiments, the sound may be output at each of the robotic speakers in the line array in sequence. For example, the sound may first be output at robotic speaker 108-2, then at robotic speaker 108-3, then at robotic speaker 108-4, and then at robotic speaker 108-5. The output of sound by the robotic speakers 108-2 thru 108-5 in sequence simulates the sound moving relative to user 102. Furthermore, if the sound is a sound that moves back and forth (e.g., a barking dog running back and forth between two positions), then the sound may be output back and forth across the line array of speakers (e.g., output via each of speakers 108-2, 108-3, 108-4, and 108-5 in sequence, then via each of the same speakers in reverse sequence, then via each of the same speakers in the original sequence, and so on).

As another example, a sound associated with the second virtual object may be output via the second line array of robotic speakers 108-7, 108-8, 108-9, and 108-10. The sound may be beam-formed and output via the robotic speakers 108-7, 108-8, 108-9, and 108-10. In embodiments where robotic speakers 108 can form one or more arrays of speakers (e.g., linear arrays, two-dimensional or planar arrays), audio manager module 214 may determine one or more processing operations that are suitable for preparing audio signals for output via the arrays of speakers (e.g., beamforming).

Figure 8:
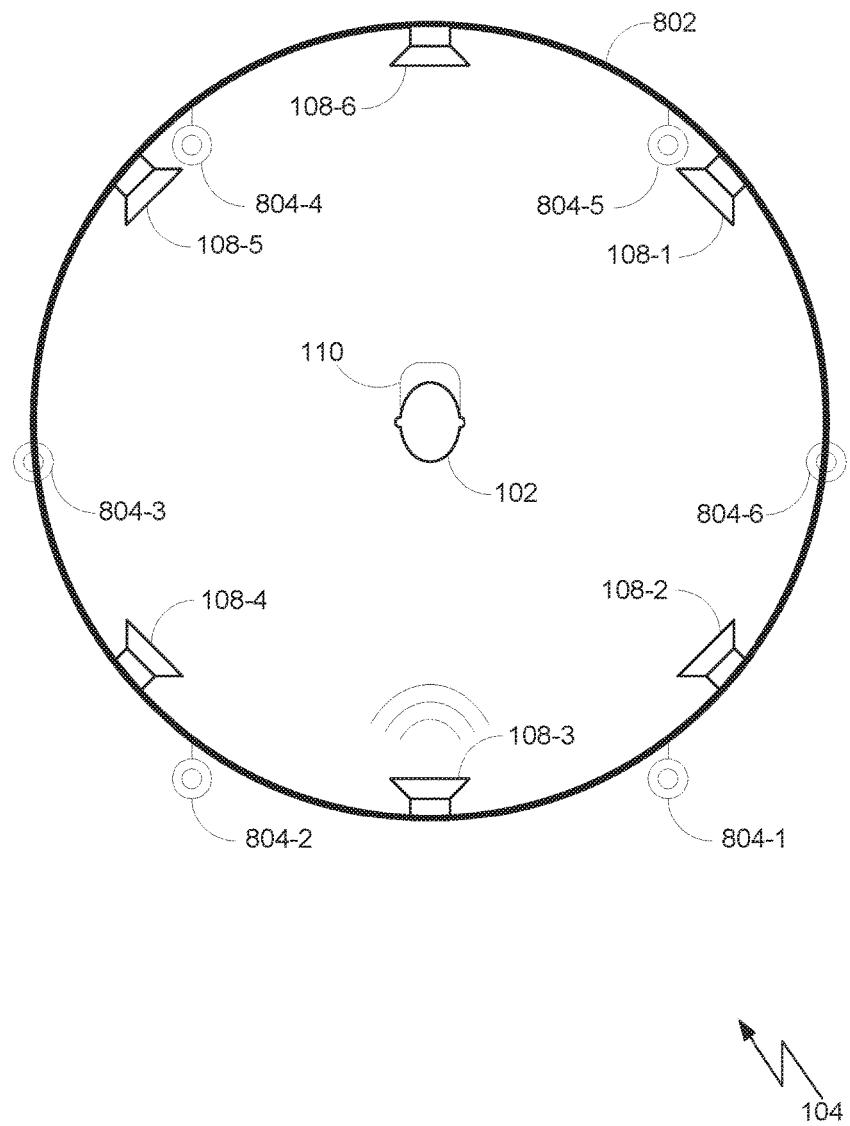
FIG. 8 is a diagram illustrating a plurality of robotic speakers arranged on a structure, according to one or more aspects of the various embodiments.

FIG. 8 is a diagram illustrating a plurality of robotic speakers arranged on a structure, according to one or more aspects of the various embodiments. As shown in FIG. 8, physical environment 104 includes robotic speakers 108-1 thru 108-6 arranged on a structure 802 (e.g., a truss structure). The structure 802 may include wheels 804-1 thru 804-6. As shown, the structure 802 is circular when viewed from a top-down perspective, and surrounds user 102. The structure 802 may be rigid. The structure 802 may rotate around user 102 and move around in the physical environment 104 via the wheels 804. Thus, the structure 802 with wheels 804 may serve as the mobility component 326 for the robotics speakers 108. The robotic speakers 108 may communicate with each other (e.g., via speaker manager modules 312) to coordinate movement and rotation of the structure 802.

In some embodiments, the structure 802 may, instead of wheels 804, have articulated robotic appendages (e.g., arms, legs) for movement and rotation. In some further embodiments, the structure 802 may be hung from a ceiling (e.g., via a pulley system). Additionally, in some embodiments, the structure 802 may be implemented as having a shape other than a circular shape when viewed from a top-down perspective, such as an ellipse, rectangle, triangle, and so forth.

Figure 9A:
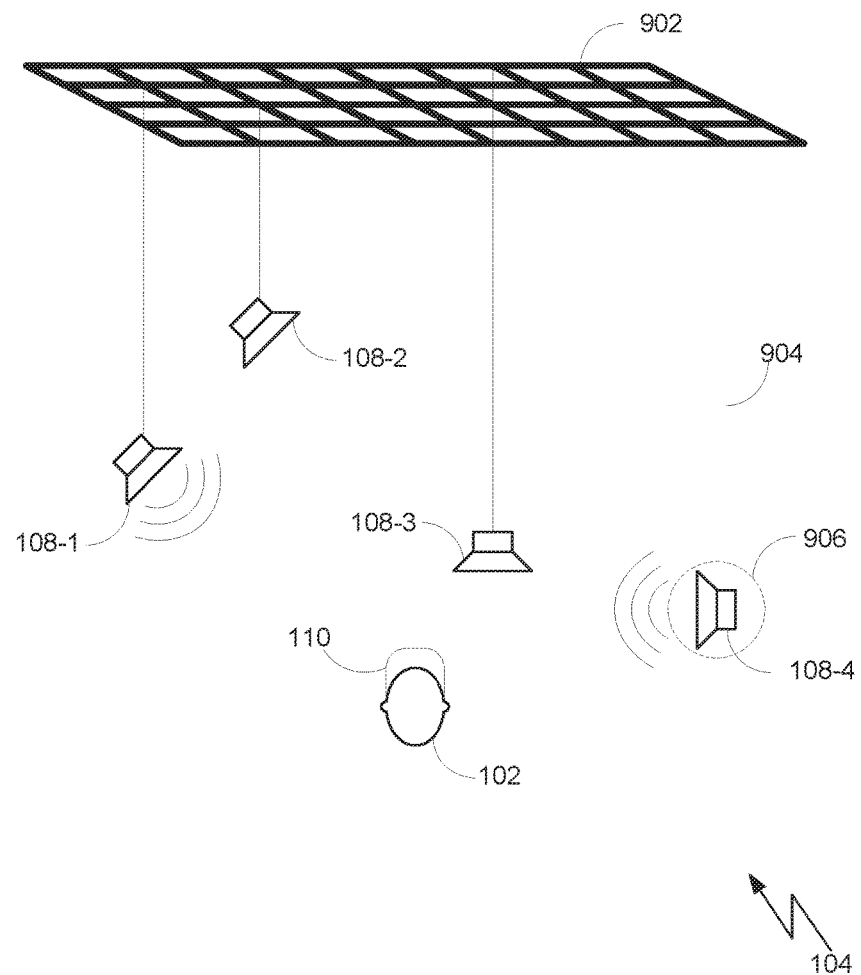
FIGS. 9A-9B is a diagram illustrating a plurality of robotic speakers hanging from a ceiling and movement of a robotic speaker by gas propulsion, according to one or more aspects of the various embodiments.
Figure 9B:
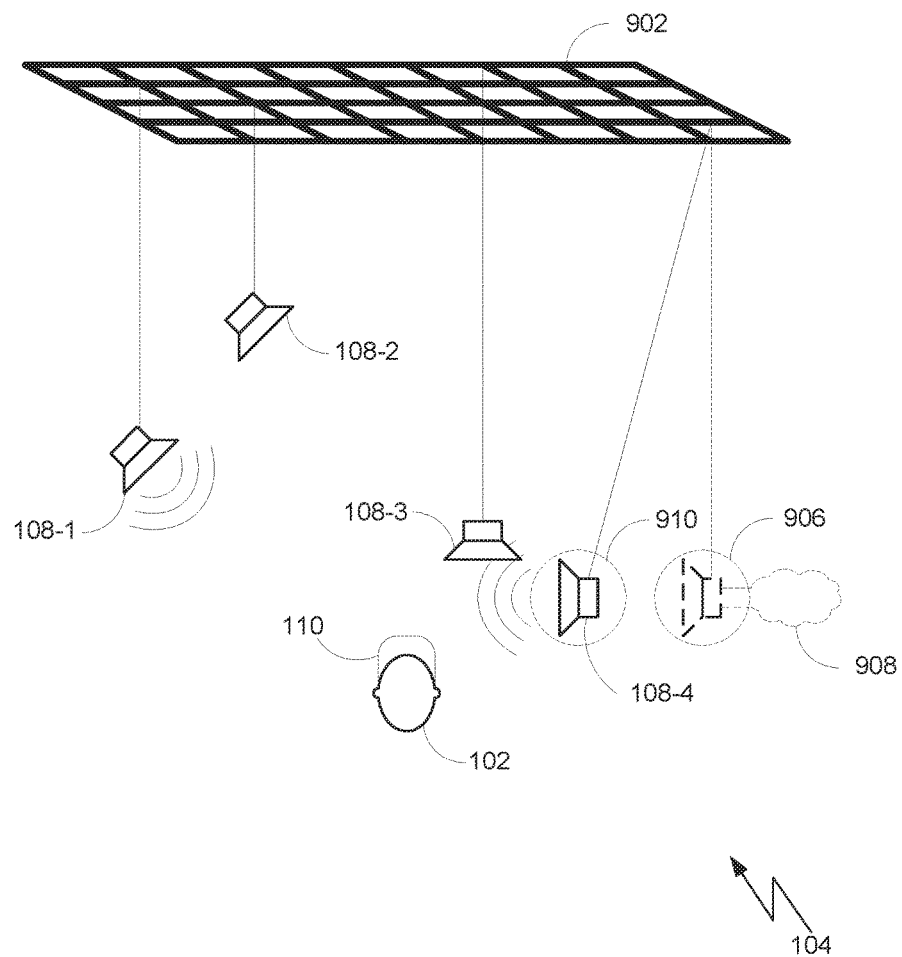

FIGS. 9A-9B is a diagram illustrating a plurality of robotic speakers hanging from a ceiling and movement of a robotic speaker by gas propulsion, according to one or more aspects of the various embodiments. As shown in FIG. 9A, physical environment 104 includes robotic speakers 108-1 thru 108-4 hanging from a ceiling structure 902. Each robotic speaker 108 may hang from ceiling structure 902 by a tether 904. As used herein, tether 904 may be of a flexible type (e.g., cable, rope, wire) or a non-flexible type (e.g., stick, pipe, pole). Depending on the type of tether, the tether 904 may include hinges at the mounting points, be motorized, and/or be actuated.

The mobility component 326 of each of the robotic speakers 108 in FIGS. 9A-9B may include a gas propulsion system. The gas propulsion system may include a container of gas (e.g., compressed gas) and a device for ejecting the gas from the gas container. For example, a robotic speaker 108-4 could move from location 906 to target location 910 by ejecting a jet of gas 908. The robotic speaker 108-4 could then be held at the target location 910 for a period of time by continuously ejecting the gas jet 908 in a controlled manner. In some embodiments, the mobility component 326 may include other forms of gas propulsion. For example, in some embodiments, the mobility component 326 may include a gas propulsion system that moves air in the physical environment 104, such as propellers, rotors, fans, and the like.

In some embodiments, the ceiling structure 902 includes one or more devices that can change the length of the tether 904 by which a robotic speaker 108 hangs. That is, in some embodiments, the tether 904 is retractable and extendable (e.g., using a motorized spool, the tether 904 is a telescopic extension pole). The device may include a communication device for communicating with the positioning module 314 of a corresponding robotic speaker 108. The device may receive instructions from the positioning module 314 regarding changing the length of the tether 904 in order to move and/or reorient the robotic speaker 108 to a target location and/or orientation.

In some further embodiments, the tethers 904 are not directly attached to the ceiling structure 902, but are attached to robots configured to crawl on or under the ceiling structure 902. The crawling robots may crawl on or under the ceiling structure 902 using any suitable techniques (e.g., micro-suction, micro-adhesion, upwards propellers, micro-spines in treads, etc.). The robots may also include devices for retracting or extending the tether 904. The crawling robot may receive instructions from the positioning module 314 in order to move and/or reorient the robotic speaker 108 to a target location and/or orientation.

In various embodiments, the robotic speakers 108 could be constrained to specific aspects of the physical environment 104. For example, each robotic speaker 108 may include one or more magnets for attachment to metal studs within the walls of the physical environment 104, and a device for moving from location to location (e.g., from stud to stud) to move across the walls. The robotic speakers 108 may also include a device (e.g., robotic appendages, gas propulsion) for movement up and down the walls.

In another example, the robotic speakers 108 are each configured to be individually capable of hovering (e.g., mounted on a hovering platform, such as a drone unit). Such a robotic speaker 108 may include a propulsion unit (e.g., caged propellers and rotors, lighter-than-air hovering device, wing mechanism) and, optionally, noise cancellation components to reduce noise from the propulsion unit. In some embodiments, the hovering approach may be adapted for use in a low gravity or zero gravity environment (e.g., at a space station). The propulsion unit in adaptations for a low or zero gravity environment may include reaction wheels, reaction control jets, or reaction coils.

It should be appreciated that the above examples of approaches or components for moving a robotic speaker 108, which may be embodied in mobility component 326, are not exhaustive. Other approaches for moving a robotic speaker 108 are possible. More generally, a robotic speaker 108 may be configured to move and change orientation using any suitable approach. For example, other example approaches in addition to the ones discussed above may include: self-balancing platforms, each of which may have a single axle with two wheels (e.g., inverted pendulum with two wheels); self-balancing platforms, each of which may sit on a single ball (single wheel) (e.g., inverted pendulum using a ball, which can traverse in any direction without changing its orientation); or a hovering mobility platform based on co-axial rotors, multi-rotors (e.g., quadcopters), or vertical gas jet based propulsion mobility platforms.

In sum, a virtual reality system identifies a virtual object in a virtual environment as a candidate for mapping to a robotic speaker. The virtual reality system then determines whether the virtual object meets one or more criteria for mapping to a robotic speaker. If the virtual object meets the one or more criteria, then the virtual reality system maps the virtual object to one or more robotic speakers. Next, the virtual reality system determines position information for the robotic speaker and optionally processes audio signals associated with the virtual object (e.g., via one or more digital signal processing algorithms) based on characteristics of the virtual object and/or the physical environment in which the user is located. The robotic speaker is then positioned according to the position information and outputs the audio signals.

At least one technological improvement achieved by the disclosed techniques is that audio output for virtual reality content more accurately represents the virtual reality content. The user perceives the visual components of the virtual reality content as co-located with the acoustic components of the virtual reality content such that, for example, the visual and acoustic representations of a virtual object match in the virtual environment, from the perspective of the user. Another technological improvement is that the audio output accounts for the acoustic characteristics of the physical environment where the user of the virtual reality system is located. Consequently, the virtual reality user experience is improved because the audio the user hears correlate more closely with what the user sees (e.g., via the virtual reality headset).

1. In some embodiments, a computing system comprises a memory including instructions; and a processor coupled to the memory and, when executing the instructions, is configured to perform the steps of mapping, to a robotic speaker, a sound associated with a virtual object included in a virtual environment; transmitting information to the robotic speaker to cause the robotic speaker to move to a location in a physical environment that corresponds to a location of the virtual object in the virtual environment; and transmitting an audio signal to the robotic speaker, wherein the robotic speaker outputs, based on the audio signal and at the location in the physical environment, the sound associated with the virtual object.

2. The system of clause 1, wherein the instructions further configure the processor to map, to the robotic speaker, a second sound associated with a second virtual object included in the virtual environment; transmit second information to the robotic speaker to cause the robotic speaker to move to a second location in the physical environment that corresponds to a location of the second virtual object in the virtual environment; and transmit a second audio signal to the robotic speaker, wherein the robotic speaker outputs, based on the second audio signal and at the second location in the physical environment, a second sound associated with the second virtual object.

3. The system of clauses 1 or 2, wherein the instructions further configure the processor to, prior to mapping the second sound to the robotic speaker, remove a mapping between the robotic speaker and the sound associated with the virtual object.

4. The system of any of clauses 1-3, wherein the instructions further configure the processor to transmit second information to the robotic speaker to cause the robotic speaker to move to a second location in the physical environment that corresponds to a second location of the virtual object in the virtual environment; and transmit a second audio signal to the robotic speaker, wherein the robotic speaker outputs, based on the second audio signal and at the second location in the physical environment, a second sound associated with the virtual object.

5. The system of any of clauses 1-4, wherein the instructions further configure the processor to determine that the sound associated with the virtual object will be mapped to the robotic speaker based on determining that a distance between the location of the virtual object within the virtual environment and a user location within the virtual environment is within a predetermined distance.

6. The system of any of clauses 1-5, wherein the instructions further configure the processor to determine that the sound associated with the virtual object will be mapped to the robotic speaker based on determining that the sound associated with the virtual object is within a predefined frequency range.

7. The system of any of clauses 1-6, wherein the instructions further configure the processor to determine, for each of a plurality of virtual objects included in the virtual environment, a mapping priority, wherein the plurality of virtual objects includes the virtual object.

8. The system of any of clauses 1-7, wherein the instructions further configure the processor to determine that a second virtual object included in the plurality of virtual objects has a higher mapping priority than the virtual object; and based on the determining: remove a mapping between the sound associated with the virtual object and the robotic speaker; and map, to the robotic speaker, a sound associated with the second virtual object.

9. The system of any of clauses 1-8, wherein the sound associated with the virtual object comprises a sound produced by the virtual object.

10. The system of any of clauses 1-9, wherein the sound associated with the virtual object comprises a sound reflected by the virtual object.

11. In some embodiments, a computer-implemented method comprises mapping, to a robotic speaker, a virtual object included in a plurality of virtual objects included in a virtual environment; transmitting information to the robotic speaker to cause the robotic speaker to move to a location in a physical environment that corresponds to a location of the virtual object in the virtual environment; and transmitting an audio signal to the robotic speaker, wherein the robotic speaker outputs, based on the audio signal and at the location in the physical environment, one or more sounds associated with the virtual object.

12. The method of clause 11, further comprising, prior to transmitting the audio signal to the robotic speaker, performing one or more processing operations on the audio signal based on at least one of the location in the physical environment and the location of the virtual object in the virtual environment.

13. The method of clauses 11 or 12, wherein the one or more processing operations include at least one of an amplitude adjustment, equalization, spatialization, and beamforming.

14. The method of any of clauses 11-13, further comprising mapping, to the robotic speaker, a second sound associated with a second virtual object included in the virtual environment; transmitting second information to the robotic speaker to cause the robotic speaker to move to a second location in the physical environment that corresponds to a location of the second virtual object in the virtual environment; and transmitting a second audio signal to the robotic speaker, wherein the robotic speaker outputs, based on the second audio signal and at the second location in the physical environment, a second sound associated with the second virtual object.

15. The method of any of clauses 11-14, further comprising transmitting second information to the robotic speaker to cause the robotic speaker to move to a second location in the physical environment that corresponds to a second location of the virtual object in the virtual environment; and transmitting a second audio signal to the robotic speaker, wherein the robotic speaker outputs, based on the second audio signal and at the second location in the physical environment, a second sound associated with the virtual object.

16. In some embodiments, an audio device comprises a mobility device; an audio output device; and one or more circuits coupled to the mobility device and the audio output device, the one or more circuits configured to receive a target location, wherein the target location corresponds to a location of a virtual object within a virtual environment; move the audio device to the target location via the mobility device; and output, via the audio output device, sound associated with the virtual object at the target location.

17. The audio device of clause 16, wherein the mobility device comprises at least one of a wheel, a robotic appendage, a gas propulsion component, and a retractable tether.

18. The audio device of clauses 16 or 17, wherein the one or more circuits are further configured to move the audio device to a second target location in response to movement of the virtual object within the virtual environment, wherein the second target location corresponds to a second location of the virtual object within the virtual environment after the movement.

19. The audio device of any of clauses 16-18, wherein the one or more circuits are further configured to receive a second target location, wherein the second target location corresponds to a location of a second virtual object within the virtual environment; move the audio device to the second target location via the mobility device; and output, via the audio output device, sound associated with the second virtual object at the second target location.

20. The audio device of any of clauses 16-19, wherein the mobility device comprises a hovering component.

Any and all combinations of any of the claim elements recited in any of the claims and/or any elements described in this application, in any fashion, fall within the contemplated scope of the described embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed towards embodiments of the present disclosure, other and further embodiments of the disclosure may be devised without departing from the basic scope thereof, and the scope thereof is determined by the claims that follow.

What is claimed is:

1. A computing system, comprising:
a memory including instructions; and
a processor coupled to the memory and, when executing the instructions, is configured to perform the steps of:
determining, from a plurality of robotic speakers, a robotic speaker to which a sound associated with a virtual object included in a virtual environment will be mapped;
mapping, to the robotic speaker, the sound associated with the virtual object included in the virtual environment;
transmitting information to the robotic speaker to cause the robotic speaker to move to a location in a physical environment that corresponds to a location of the virtual object in the virtual environment; and
transmitting an audio signal to the robotic speaker, wherein the robotic speaker outputs, based on the audio signal and at the location in the physical environment, the sound associated with the virtual object.

2. The system of claim 1, wherein the instructions further configure the processor to:
map, to the robotic speaker, a second sound associated with a second virtual object included in the virtual environment;
transmit second information to the robotic speaker to cause the robotic speaker to move to a second location in the physical environment that corresponds to a location of the second virtual object in the virtual environment; and
transmit a second audio signal to the robotic speaker, wherein the robotic speaker outputs, based on the second audio signal and at the second location in the physical environment, a second sound associated with the second virtual object.

3. The system of claim 2, wherein the instructions further configure the processor to, prior to mapping the second sound to the robotic speaker, remove a mapping between the robotic speaker and the sound associated with the virtual object.

4. The system of claim 1, wherein the instructions further configure the processor to:
transmit second information to the robotic speaker to cause the robotic speaker to move to a second location in the physical environment that corresponds to a second location of the virtual object in the virtual environment; and
transmit a second audio signal to the robotic speaker, wherein the robotic speaker outputs, based on the second audio signal and at the second location in the physical environment, a second sound associated with the virtual object.

5. The system of claim 1, wherein the instructions further configure the processor to determine that the sound associated with the virtual object will be mapped to the robotic speaker based on determining that a distance between the location of the virtual object within the virtual environment and a user location within the virtual environment is within a predetermined distance.

6. The system of claim 1, wherein the instructions further configure the processor to determine that the sound associated with the virtual object will be mapped to the robotic speaker based on determining that the sound associated with the virtual object is within a predefined frequency range.

7. The system of claim 1, wherein the instructions further configure the processor to determine, for each of a plurality of virtual objects included in the virtual environment, a mapping priority, wherein the plurality of virtual objects includes the virtual object.

8. The system of claim 7, wherein the instructions further configure the processor to:
determine that a second virtual object included in the plurality of virtual objects has a higher mapping priority than the virtual object; and
based on the determining:
remove a mapping between the sound associated with the virtual object and the robotic speaker; and
map, to the robotic speaker, a sound associated with the second virtual object.

9. The system of claim 1, wherein the sound associated with the virtual object comprises a sound produced by the virtual object.

10. The system of claim 1, wherein the sound associated with the virtual object comprises a sound reflected by the virtual object.

11. A computer-implemented method, comprising:
determining, from a plurality of robotic speakers, a robotic speaker to which a virtual object included in a plurality of virtual objects included in a virtual environment will be mapped;
mapping, to the robotic speaker, the virtual object included in the plurality of virtual objects included in the virtual environment;
transmitting information to the robotic speaker to cause the robotic speaker to move to a location in a physical environment that corresponds to a location of the virtual object in the virtual environment; and
transmitting an audio signal to the robotic speaker, wherein the robotic speaker outputs, based on the audio signal and at the location in the physical environment, one or more sounds associated with the virtual object.

12. The method of claim 11, further comprising, prior to transmitting the audio signal to the robotic speaker, performing one or more processing operations on the audio signal based on at least one of the location in the physical environment and the location of the virtual object in the virtual environment.

13. The method of claim 12, wherein the one or more processing operations include at least one of an amplitude adjustment, equalization, spatialization, and beamforming.

14. The method of claim 11, further comprising:
mapping, to the robotic speaker, a second sound associated with a second virtual object included in the virtual environment;
transmitting second information to the robotic speaker to cause the robotic speaker to move to a second location in the physical environment that corresponds to a location of the second virtual object in the virtual environment; and transmitting a second audio signal to the robotic speaker, wherein the robotic speaker outputs, based on the second audio signal and at the second location in the physical environment, a second sound associated with the second virtual object.

15. The method of claim 11, further comprising:

transmitting second information to the robotic speaker to cause the robotic speaker to move to a second location in the physical environment that corresponds to a second location of the virtual object in the virtual environment; and transmitting a second audio signal to the robotic speaker, wherein the robotic speaker outputs, based on the second audio signal and at the second location in the physical environment, a second sound associated with the virtual object.

16. An audio device, comprising:

a mobility device;

an audio output device; and one or more circuits coupled to the mobility device and the audio output device, the one or more circuits configured to:

receive a target location, wherein the target location corresponds to a location of a virtual object within a virtual environment;

move the audio device to the target location via the mobility device; and output, via the audio output device, sound associated with the virtual object at the target location, wherein the sound is outputted via the audio output device based on determining, from a plurality of audio output devices, that the sound associated with the virtual object will be mapped to the audio output device.

17. The audio device of claim 16, wherein the mobility device comprises at least one of a wheel, a robotic appendage, a gas propulsion component, and a retractable tether.

18. The audio device of claim 16, wherein the one or more circuits are further configured to move the audio device to a second target location in response to movement of the virtual object within the virtual environment, wherein the second target location corresponds to a second location of the virtual object within the virtual environment after the movement.

19. The audio device of claim 16, wherein the one or more circuits are further configured to:

receive a second target location, wherein the second target location corresponds to a location of a second virtual object within the virtual environment;

move the audio device to the second target location via the mobility device; and output, via the audio output device, sound associated with the second virtual object at the second target location.

20. The audio device of claim 16, wherein the mobility device comprises a hovering component.

* * * * *